United States Patent [19]
Blackburn

[11] 3,764,028
[45] Oct. 9, 1973

[54] CONTAINER STALL INTERCHANGE
[76] Inventor: Horace D. Blackburn, 333 Sixth Ave. West, Bradenton, Fla. 33505
[22] Filed: May 9, 1972
[21] Appl. No.: 251,819

[52] U.S. Cl. .............................. 214/38 CC, 254/45
[51] Int. Cl. ............................................ B65g 67/24
[58] Field of Search ................ 214/38 CC; 254/45

[56] References Cited
UNITED STATES PATENTS
3,151,751   10/1964   Marini ........................... 214/38 CC
3,421,646   1/1969   Rouse et al. ................. 214/38 CC X
2,069,236   2/1937   Fitch .......................... 214/38 CC X

*Primary Examiner*—Robert G. Sheridan
*Attorney*—J. Gibson Semmes

[57] ABSTRACT

A stall construction for individually lifting, lowering and removing multiple cargo containers from transport vehicles is described.

3 Claims, 6 Drawing Figures

Patented Oct. 9, 1973

CONTAINER STALL INTERCHANGE

BACKGROUND OF THE INVENTION

It has been known to elevate cargo containers or transporting vehicles for retaining and supporting the cargo containers so that the transporting means can be utilized during container loading and unloading. See, for example, U.S. Pat. No. 2,069,236 to Fitch, and U.S. Pat. No. 3,612,315 to Blackburn. Such apparatuses, however, do not contemplate the complexities of currently used multiple cargo container transport trailer systems.

The present invention obviates these disadvantages and has as a purpose the selective removal and holding of cargo containers without sophisticated container mounted support systems.

DESCRIPTION OF THE PREFERRED EMBODIMENTS

Figure 1:
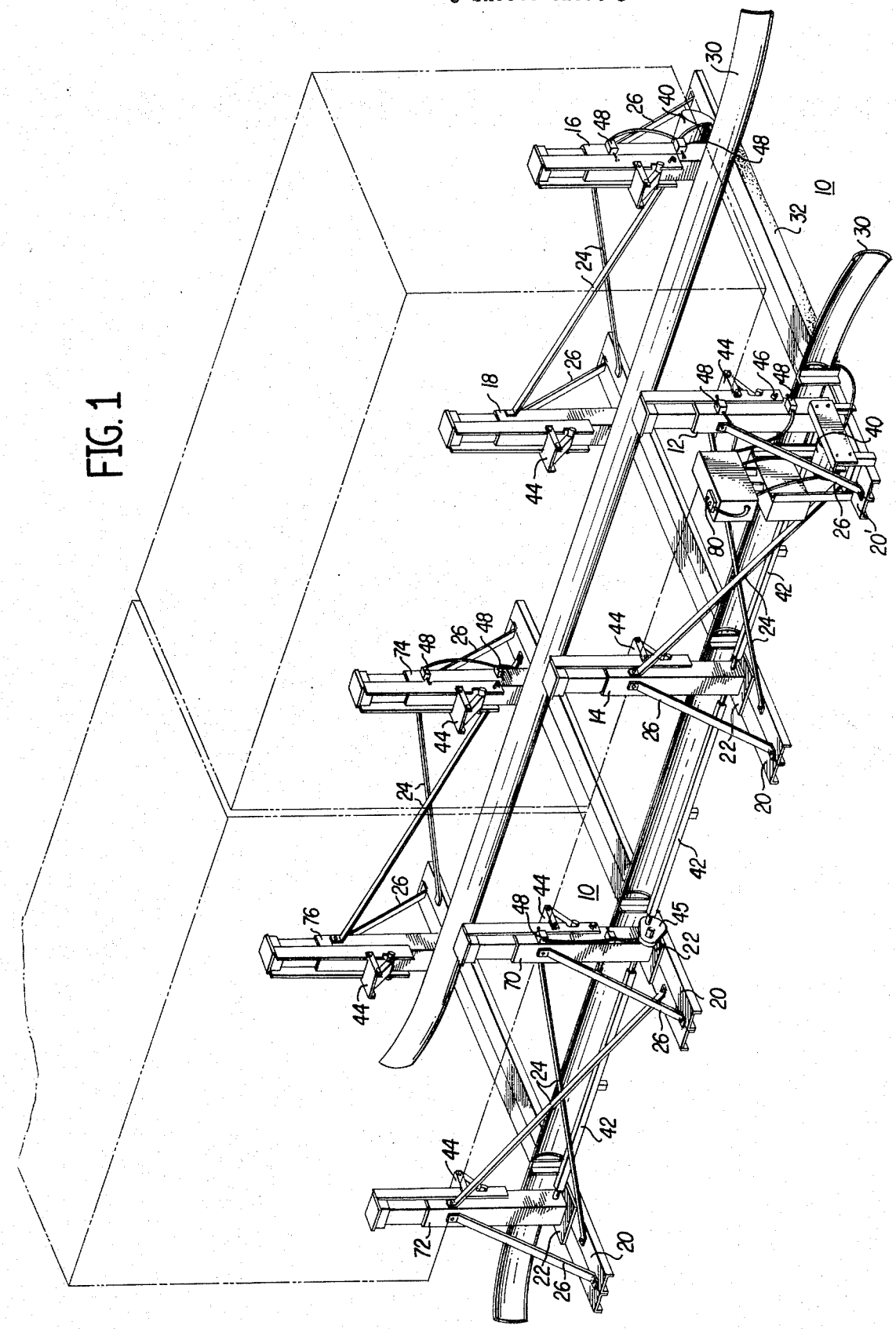
FIG. 1 illustrates a perspective view of the preferred embodiment of the invention, showing containers in phantom.

Referring now to FIG. 1, a perspective view of the preferred embodiment of the present invention as shown. A pathway 10 is defined wide enough for a multiple cargo container trailer and tractor to pass therethrough. Positioned along the pathway are complemental cargo container lifting and lowering systems or jacks which will be described hereafter in detail.

A first cargo lifting and lowering jack is shown having four jack-type posts 12, 14, 16 and 18. Two posts are placed on each side, or astride the pathway 10. Post 12 is positioned complementally opposite the pathway 10 from post 16, and post 14 is placed opposite post 18, as shown. The posts are removably fixed to base transoms 20 through base plates 22. Complemental posts, as for example, posts 12, 16, are fixed to the same base transom, as, for example, 20'. The base transoms 20 transversing the pathway 10 are shown made of finished steel, but may be made of any material which maintains complemental posts in spaced tandem relationship while cargo containers are held aloft.

The posts on one side of a pathway 10, as for example, the posts 12, 14, are supported by a trestle type support consisting of cross-struts 24. The struts 24 are fixed at one of their ends to the upper end of that part or section 26 of the post which remains stably fixed to a transverse base transom. The other ends of these struts 24 are fixed to another base transom 20 at a distance from base plate 22 and away from the pathway 10, as shown. In addition, each post is shown having a strut 26 co-linear to the base transom 20. The upper end of each strut 26 is fixed to the corresponding upper end of that part or section 36 of the post stably fixed to the base transom 20. The lower end of each strut 26 is fixed to the base transom 20, again spaced a distance from the base of the post, away from the pathway 10.

Guardrails 30 are secured alongside the pathway 10 so to guide vehicles being maneuvered therethrough. Additionally, treadway 32 may be placed on either side of base transoms 20 to guide vehicle tires moving along the pathway 10 over the base transoms 20. Obviously, the guide rails may be formed of several elements to increase and diminish the relative longitudinal position of the jack-like posts.

Figure 2:
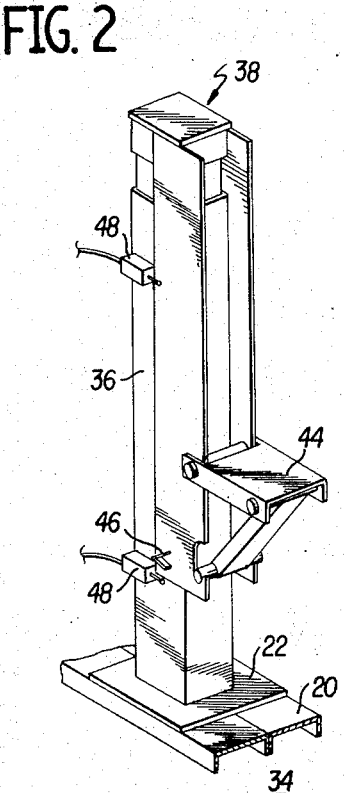
FIG. 2 illustrates an enlarged perspective view of one post support shown in FIG. 1.

Each post, seen more clearly in FIG. 2, is vertically extensible, a rigid section 36 of the post 34, for example, being fixed to base plate 22. A vertically extensible post section 38 fits movably onto post section 36. Movable post section 38 is raised or lowered vertically by a jackscrew, not shown, disposed within the posts. Motor 40 drives transmission linkage 42, driving the jackscrews in the posts.

Vertically extensible post section 38 has fixed thereon a cargo container engaging shoe 44. In addition, a switch actuating finger 46 is disposed strategically on the extensible post section 38 for automatically interrupting power to the jackscrew at predetermined moments in the vertical movement of the post. As shown in FIG. 2, microswitches 48 are disposed on the stable post section 36. The upper and lower microswitches 48 switch the motors 40 "off." Motors 40 are switched to either turn the jackscrews clockwise or counterclockwise to either raise or lower the shoes 44 and extensible post sections 38 by switch 80.

Figure 3:
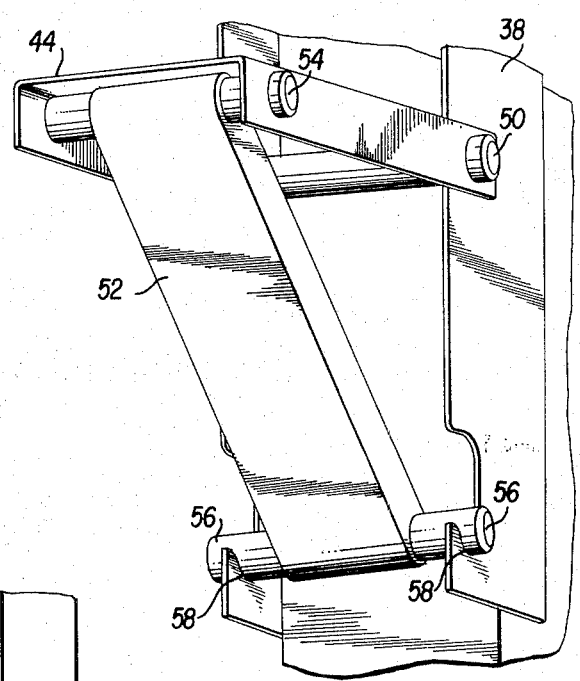
FIG. 3 illustrates a detailed perspective view of the cargo engaging mechanism of FIG. 2.
Figure 4:
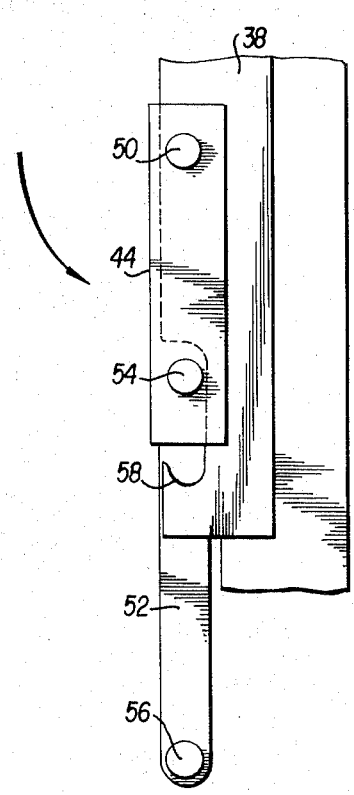
FIG. 4 illustrates a side elevational view of FIG. 3.

As seen more clearly in detail in FIG. 3, the container engaging shoe 44 is pivotally mounted on extensible post section 38 by hinge pin 50. A brace arm 52 is pivotally mounted to shoe 44 by hinge pin 54. The free end of brace arm 52 has laterally extending lugs 56 for engaging hooks 58 machined into extensible post section 38, reference FIG. 3. FIG. 4 shows the container engaging shoe 44 hanging flush against the post 34 when the plate 44 is not in use.

A second container lifting and lowering system is shown disposed along the pathway 10 disposed longitudinally apart from the first container lifting system described above. This second system is essentially identical to the first system as described, posts 70, 72, 74 and 76 corresponding to posts, respectively, 12, 14, 16 and 18. The second lifting system, however, is capable of hoisting a cargo container at least higher than the hoist level of the first lifting system. The posts 70, 72, 74 and 76 are identical to the post 34 shown in FIGS. 2 through 4 and described above in detail.

The posts 70, 72, 74 and 76 may have their upper microswitches 48 placed higher on their respective stable post sections 36 than on the respective post sections 36 for posts 12, 14, 16 and 18 so that the container lifted by the second system will remain at a level higher than the container held by the first system. Preferably, however, to achieve in practice the simultaneous elevation of the rearward-most positions, the following steps can be taken. First, elevate all of the posts simultaneously to a pre-selected differential above the lowermost position. Then, disconnect the drive shafts 42 which are interposed between the forwardmost and the rearwardmost posts in the longitudinal center of the device. Then, lower the forwardmost posts to their original position and reconnect the drive shaft and the system is then operative to effect the disproportionate height between respective forwardmost and rearwardmost containers.

In operation, a line trailer 86 or other multiple cargo container bearing vehicle is maneuvered through pathway 10 so that its cargo containers are disposed within the cargo lifting and lowering jacks as described above, reference FIG. 5. An operator manually positions engaging shoes 44 by inserting lugs 56 within hooks 58. By actuation of the motor at switch 80, jackscrews in the eight posts 12, 14, 16, 18, 70, 72, 74 and 76 are turned by power from the motor 40 through linkages 42. The vertically extensible sections 38 of the posts are lifted until engaging shoes 44 engage the underside of containers 82, 84. The vertically extensible sections 38 continue rising, thus hoisting containers 82, 84 from the line trailer. The extensible sections 38 continue lifting the cargo containers until switch actuating fingers 46 on each post trip the upper microswitch 48 on that post, stopping the motors 40.

As soon as the containers are hoisted off of the trailer 86, the trailer or other multiple container carrying vehicle 86 can be removed from the pathway 10 and utilized for other cargo shipments.

Frequently, straight trucks will be utilized to redistribute the cargo containers 82, 84 within a loading zone or local marketing area. These straight trucks frequently have lift platforms at the rear of their flatbed sections, these lift platforms frequently resting at a level higher than the flatbed itself. Thus, with this multiple level cargo container holding system as described, a straight truck can back into pathway 10, lower one of the cargoes on its flatbed, and remove from the container holding system while the second container cargo remains hoisted on the second cargo container lifting system. Because the second container 84 is held at a predetermined level higher than the level of the first container 82, the truck lift found at the end of flatbeds of straight trucks will not engage or be disturbed by the second container. When the cargo containers are removed from the cargo hoisting systems, the lugs 56 on brace arm 52 can be removed from hook 58, allowing the shoe 44 and brace arm 52 to hang flush with the posts, reference FIG. 4. In this mode, vehicles can be maneuvered in pathway 10 without being obstructed by the inwardly disposed shoes 44. A second straight truck can then maneuver within pathway 10, lower the second cargo 84 upon its flatbed section, and remove the second cargo to a further destination.

While the jackscrews can be controlled in both container lifting jacks, as described, by one switch 80 and one motor 40, it can be appreciated that the jackscrews in the posts of the forward container holding jack can be disconnected from the jackscrews in the second or aft container holding jack by disconnecting linkages 42 at linkage separator 45. Thus, with the linkages 42 disconnected, the jackscrews in the forward container holding jack can be powered to lower the container 82 while maintaining the second container 84 aloft, reference FIG. 6.

A possible modification of this invention as described could be made by installing hydraulic fluid pressure pumps to hydraulically lift, hold and lower the vertically extensible posts.

Figure 5:
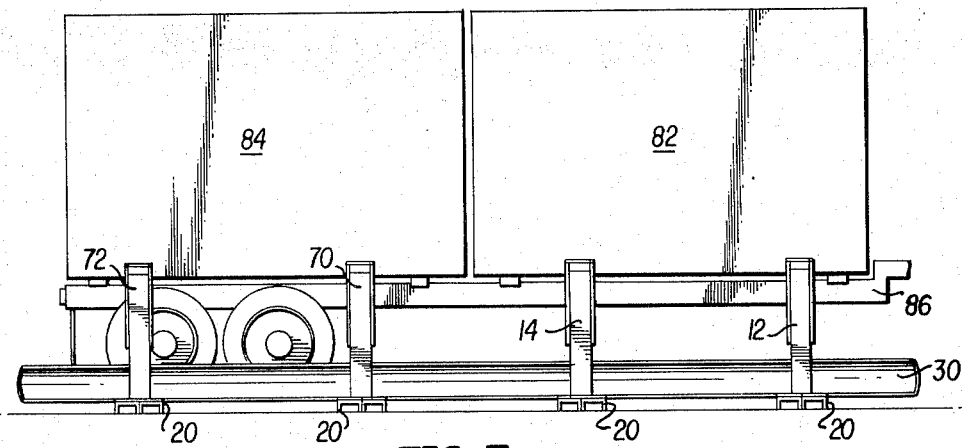
FIG. 5 and FIG. 6 illustrate a schematic of the preferred operational embodiment of the present invention.
Figure 6:
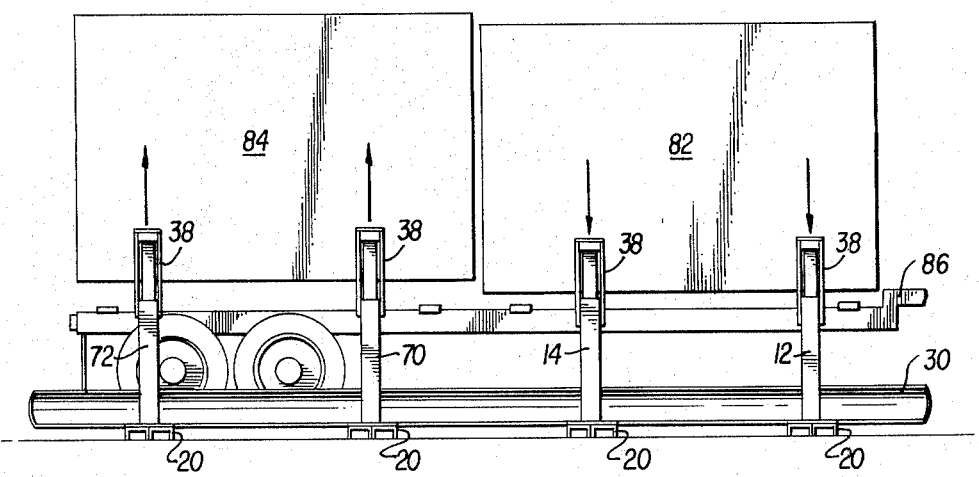

While being held aloft, the weight of the cargo containers 82, 84 exert downward force on the engaging plates 44. The resultant torque force upon the posts is inward toward the center of pathway 10. This inward torque is off-set by tension strain in trestle struts 24 and struts 26 which, as noted above, have their lower ends fixed to the base transom 20 away from pathway 10, as shown in FIGS. 1, 5 and 6.

As can be seen from the drawings and the description, the system as taught is relatively simple, its component parts consisting of mechanical links powered by a simple motor which could be arranged to be operated by manual crank should an emergency circumstance so require. This invention can be easily broken-down and reconstructed in any desired location with relative ease.

Of course, several of such jack systems can be placed having their pathways 10 either in tandem or in parallel adjacent one another. In this mode, containers waiting to be transported can be instantly loaded on a trailer after freshly delivered containers are hoisted on the adjacent jack system as described.

I claim:

1. Apparatus for lifting, lowering and removing plural, longitudinally disposed cargo containers from a transport vehicle, comprising:
  A. first and second oppositely disposed pairs of jacks, having upper and lower ends, spaced transversely so as to define a pathway for the transport vehicle;
  B. third and fourth oppositely disposed pairs of jacks, having upper and lower ends, spaced transversely so as to define an extension of the pathway for the transport vehicle and spaced longitudinally from the first and second pairs of jacks so as to place the first and second pairs of jacks in position to lift, lower or remove one of the plurality of cargo containers and so as to place the third and fourth pairs of jacks in position to lift, lower or remove another of the plurality of cargo containers;
  C. means for guiding the transport vehicle between the transversely spaced pairs of jacks;
  D. first strut elements joining the upper end of each jack of each pair to a fixed point spaced outside the pathway and transversely away from the lower end of the other jack of each pair;
  E. second strut elements joining the upper end of each individual jack to a fixed point spaced outside the pathway and transversely away from the lower end of the same individual jack;
  F. collapsible lifting and lowering shoes attached to each jack;
  G. means for selectively operating the first and second pairs of jacks to lift, lower or remove one of the plurality of cargo containers; and
  H. means for selectively operating the third and fourth pairs of jacks to lift, lower or remove another of the plurality of containers.

2. The apparatus of claim 1, wherein the collapsible lifting and lowering shoes comprise:
  F1. a container engaging shoe plate having spaced ends, one end thereof pivotably mounted to each jack;
  F2. a brace arm having spaced ends, one end thereof pivotably mounted to the other end of the shoe plate and having laterally extending lugs on the other end; and
  F3. means mounted on the jack for releasibly engaging the laterally extending lugs, thereby to support the shoe plate in a container engaging position.

3. The apparatus of claim 1, wherein the jacks are screw jacks; the means for operating the pairs of jacks comprise motors connected to one jack on each side of the pathway; and drive shafts connected between individual jacks on each side of the pathway.

* * * * *